United States Patent [19]

Melocik

[11] Patent Number: 4,680,512
[45] Date of Patent: Jul. 14, 1987

[54] FAULT PROTECTION APPARATUS FOR TRACTION MOTOR CIRCUIT

[75] Inventor: Grant C. Melocik, Chardon, Ohio

[73] Assignee: Caterpillar Industrial Inc., Mentor, Ohio

[21] Appl. No.: 864,237

[22] Filed: May 19, 1986

[51] Int. Cl.⁴ .............................................. H02H 7/08
[52] U.S. Cl. .................................. 318/139; 318/434; 318/484; 361/29
[58] Field of Search ...................... 361/23, 30, 28, 29; 318/139, 345 C, 345 D, 345 H, 434, 445, 447, 484, 599

[56] References Cited

U.S. PATENT DOCUMENTS

| | | | |
|---|---|---|---|
| 3,973,176 | 8/1976 | Rohsler | 318/139 X |
| 4,017,775 | 4/1977 | Artrip | 318/139 |
| 4,081,725 | 3/1978 | Schmidt et al. | 318/139 |
| 4,093,901 | 6/1978 | Rose | 361/30 X |
| 4,200,832 | 4/1980 | Johansson et al. | 318/139 X |
| 4,508,999 | 4/1985 | Melocik et al. | 318/331 |
| 4,521,885 | 6/1985 | Melocik et al. | 371/29 |

FOREIGN PATENT DOCUMENTS 55-46884  4/1980  Japan .................... 318/434

Primary Examiner—William M. Shoop, Jr.
Assistant Examiner—Bentsu Ro
Attorney, Agent, or Firm—Stephen L. Noe

[57] ABSTRACT

Motor control circuits having fault protection devices are in commercial use today. Such devices typically include logic elements requiring a conditioned power supply, and are incapable of operation directly from the main motor power supply. The subject apparatus includes a timing circuit for monitoring the electrical conduction of a power switching element associated with an electrical motor. The apparatus produces a fault signal in response to the power switching element continuing to conduct for longer than a predetermined continuous period of time. A latch receives the fault signal and responsively produces a blocking signal. An interrupt circuit receives the blocking signal and responsively controllably blocks power from the motor power supply to the electrical motor. Each of the timing, latch, and interrupt circuits is adapted to operate directly from the motor power supply and independent of any intermediate logic power supplies or associated logic devices.

2 Claims, 3 Drawing Figures

FAULT PROTECTION APPARATUS FOR TRACTION MOTOR CIRCUIT

DESCRIPTION

1. Technical Field

This invention relates generally to an apparatus for controlling an electrical motor and, more particularly, to an apparatus for detecting a fault in a component of an electrical motor control circuit and controllably disabling the motor.

2. Background Art

Electrical motors utilizing power switching element type control circuits are in common commercial use today. For example, industrial vehicles such as lift trucks commonly utilize an electrical motor connected to a heavy-duty battery through a power switching element. Such power switching elements are typically semiconductor switches of the SCR or transistor variety. Failure of the semiconductor switch to properly commutate causes the electrical motor to continue running at an undeterminable speed. Such failure to commutate can result from a short circuit condition of the semiconductor switch or from failure of a control element associated with the semiconductor switch. Whatever the cause, it is desirable to detect faults of this nature and to responsively disable the motor circuit until the fault is repaired.

Various types of fault detection devices have been incorporated in motor control circuits in the past. For example, one such effective device is disclosed in U.S. Pat. No. 4,508,999 issued Apr. 2, 1985 to Melocik et al., and assigned to the assignee of the instant application. The apparatus disclosed in U.S. Pat. No. 4,508,999 employs a sensing device for determining when a semiconductor switch employed in a power switching element circuit has failed to commutate within a predetermined period of time, and for delivering a responsive signal to a logic circuit. Upon receiving the fault signal, the logic circuit controllably disconnects the vehicle power supply from the motor circuit. The basic problem with such known fault detection devices is that logic circuitry, including but not limited to microprocessors and discrete logic gates, is utilized in the fault detection and disabling process. Therefore, failure of the logic circuitry prevents the detection apparatus from functioning. In addition, such logic and logic circuit devices require conditioned power supplies for proper operation. The conditioning of the power supply is typically performed by a voltage regulator operating from the main motor power supply or battery. Such power supplies are particularly susceptible to damage owing to the typical operating conditions of industrial vehicles. Failure of the logic power supply likewise may render the fault detection device inoperable. Therefore, it is desirable to provide a fault detection and protection device that operates directly from the primary motor power supply and independent of any logic circuitry and intermediate logic power supplies.

The present invention is directed to overcoming one or more of the problems as set forth above.

DISCLOSURE OF THE INVENTION

In one aspect of the present invention, an apparatus for controllably disabling an electrical motor circuit in response to detecting a predetermined condition of a power switching element is provided. The electrical motor circuit includes an electrical motor serially connected with a motor power supply through the power switching element. The apparatus includes a timing circuit for monitoring the electrical conduction of the power switching element and producing a fault signal in response to the power switching element continuing to conduct for longer than a predetermined period of time. A latch receives the fault signal and responsively produces a blocking signal which is delivered to an interrupt circuit. The interrupt circuit responsively controllably blocks power from the motor power supply to the electrical motor. Each of the timing, latch, and interrupt devices is adapted to operate directly from the motor power supply.

The instant apparatus provides a fault protection device that operates directly from the motor power supply without requiring an intermediate conditioned power supply. In addition, the instant apparatus is advantageously low in cost and rugged in construction.

BRIEF DESCRIPTION OF THE DRAWINGS

For a better understanding of the present invention, reference may be made to the accompanying drawings, in which.

BEST MODE FOR CARRYING OUT THE INVENTION

Figure 1:
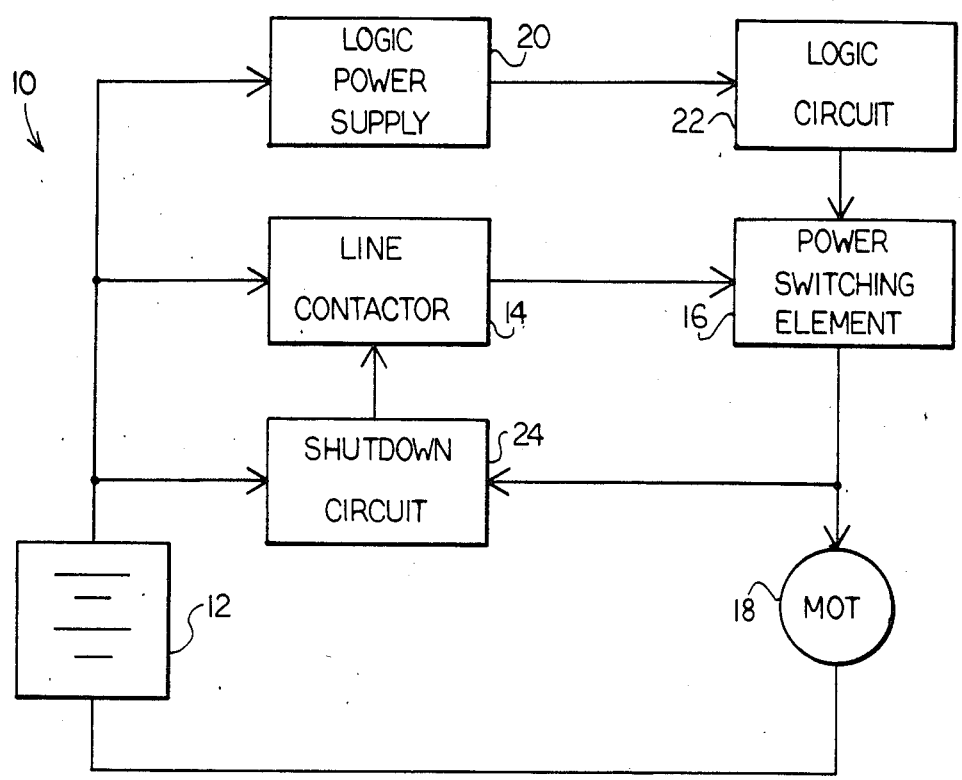
FIG. 1 is a block diagram of one embodiment of the present invention.

Referring first to FIG. 1, an apparatus embodying certain of the principles of the present invention is generally indicated by the reference numeral 10. It should be understood that the following detailed description relates to the best presently known embodiment of the apparatus 10. However, the apparatus 10 can assume numerous other embodiments, as will become apparent to those skilled in the art, without departing from the appended claims.

In the block diagram of FIG. 1, the motor power supply 12 is serially connected through a line contactor 14 and a power switching element 16 to a motor 18. The motor power supply 12 is, for example, a heavy-duty storage battery having a nominal voltage of 48 volts. The line contactor 14 is a solenoid controlled switch or relay interposed between the motor power supply 12 and the power switching element 16. The power switching element 16 is preferably a semiconductor switch such as a heavy-duty transistor. In the exemplary embodiment, the motor 18 is the traction motor of a vehicle such as an industrial lift truck. The combination of motor power supply 12, line contactor 14, power switching element 16, and motor 18 can also be utilized in various other devices requiring a motor and motor control circuit.

A logic power supply 20 is connected to the motor power supply 12 and produces conditioned electrical power that is utilized by various circuit elements associated with the apparatus 10. For example, the logic power supply 20 delivers conditioned electrical power to a logic circuit 22 associated with the power switching element 16. In a typical motor control circuit, the logic circuit 22 delivers control signals in the form of pulse width modulated pulse trains to the power switching element 16. Responsively, the power switching element 16 turns "on" and "off" to determine the mean power delivered from the motor power supply 12 through the line contactor 14 to the motor 18.

A shutdown circuit 24 is connected directly to the motor power supply 12, the junction between the power switching element 16 and the motor 18, and the line contactor 14. The shutdown circuit 24 forms the basis for the instant invention, and is fully described below.

Figure 2:
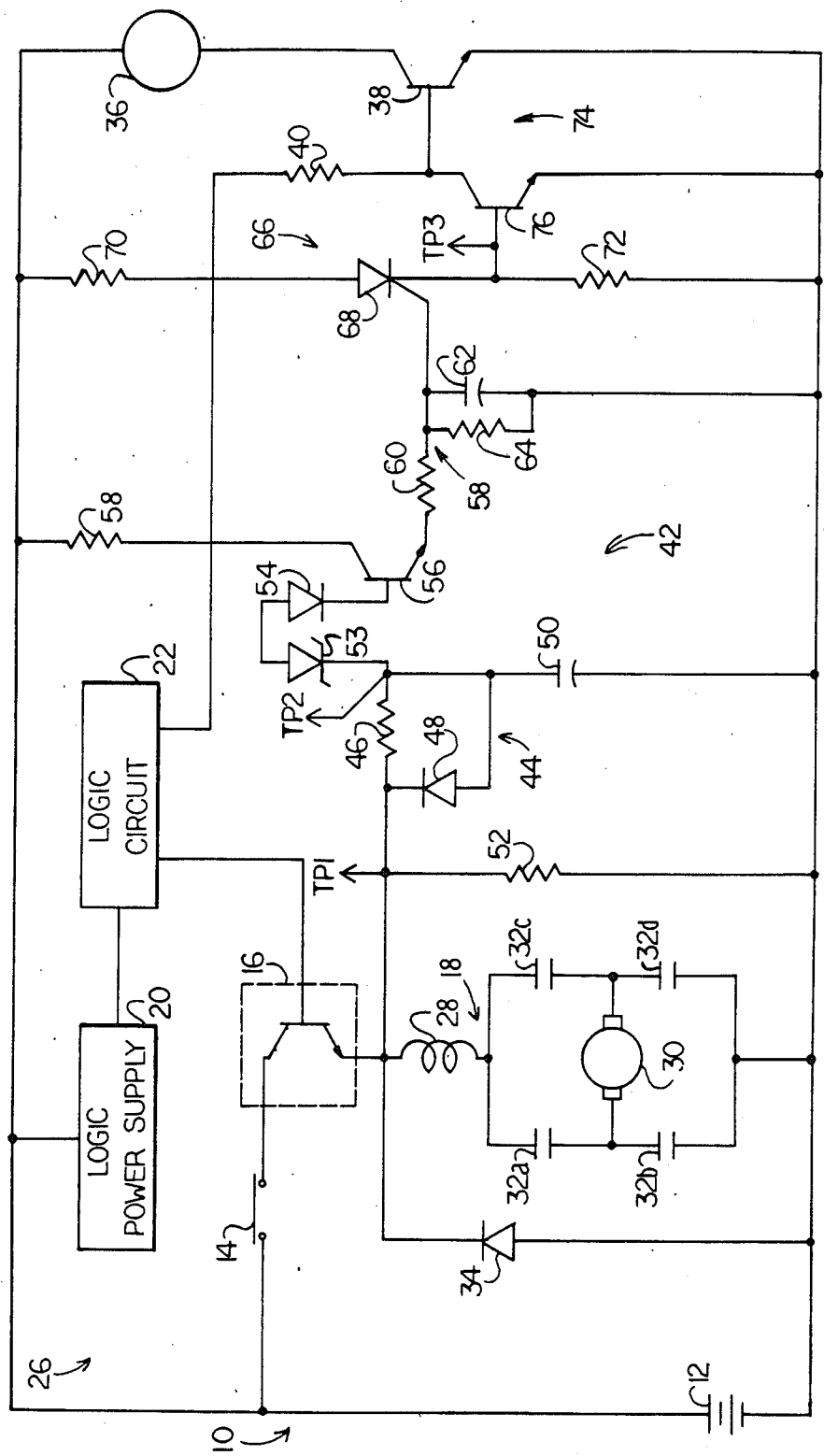
FIG. 2 is a schematic representation of the embodiment of FIG. 1.

Referring next to FIG. 2, the embodiment of FIG. 1 is shown in detail in schematic form. An electrical motor circuit 26 includes the motor power supply 12 connected through the line contactor 14 and the power switching element 16 to the electrical motor 18. The electrical motor 18 includes a field winding 28 and an armature 30. Direction contactors 32a,32b,32c,32d controllably determine the direction of rotation of the motor armature 30. A flyback diode 34 is connected in parallel across the electrical motor 18. The logic power supply 20 is connected to the motor power supply 12 and delivers conditioned electrical power to the logic circuit 22. The logic circuit 22 responds to various input control elements, for example, accelerator and direction control devices (not shown), and produces time duration controlled pulses that are delivered to the power switching element 16. Responsively, the electrical motor 18 is operated in accordance with the mean power delivered by the power switching element 16, assuming that the line contactor 14 is in the closed position. In response to the line contactor 14 being in the open position, power is interrupted from the motor power supply 12 to the power switching element 16, and the electrical motor circuit 26 is disabled.

The line contactor 14 is controlled by an associated solenoid coil 36. The solenoid coil 36 is connected to the motor power supply 12 and is controllably operated by a transistor switch 38. In response to the transistor switch 38 being "on", the solenoid coil 36 is energized and the line contactor 14 is closed. In response to the transistor switch 38 being in the nonconducting state, the solenoid coil 36 is deenergized and, responsively, the line contactor 14 is in the open position. The transistor switch 38 is operated, in part, in response to a signal delivered from the logic circuit 22 through a resistor 40.

A timing means 42 monitors the electrical conduction of the power switching element 16 and produces a fault signal in response to the power switching element 16 continuing to conduct for longer than a predetermined continuous period of time. The timing means 42 includes an R/C timing element 44 having a resistor 46 connected to the junction of the power switching element 16 and the electrical motor 18. The resistor 46 is connected in parallel with a diode 48 to a capacitor 50, which in turn is connected to circuit ground. A resistor 52 is connected in parallel with the electrical motor 18. The timing means 42 also includes a zener diode 53 and a diode 54 serially connected between the resistor 46 and a transistor switch 56. The transistor switch 56 is connected to the motor power supply 12 through a resistor 58.

An output terminal of the transistor switch 56 is connected to a conditioning circuit 58. The conditioning circuit 58 includes a current limiting resistor 60 connected in series between the output terminal of the transistor switch 56 and a capacitor 62. A resistor 64 is connected in parallel with the capacitor 62 and to circuit ground.

A latch means 66 has an input terminal connected to the junction of the resistor 60, capacitor 62, and resistor 64. The latch means 66 includes an SCR 68 having an anode connected through a resistor 70 to the motor power supply 12. The cathode of the SCR 8 is connected through a resistor 72 to circuit ground. The latch means 66 receives a fault signal from the timing means 42 and responsively produces a blocking signal.

An interrupt means 74 receives the blocking signal from the latch means 66 and responsively controllably blocks power from the motor power supply 12 to the electrical motor 18. The interrupt means 74 includes a transistor switch 76 having an input terminal connected to the cathode of the SCR 68. The interrupt means 74 is connected between the junction of the transistor switch 38 and the resistor 40, and circuit ground.

INDUSTRIAL APPLICABILITY

Figure 3:
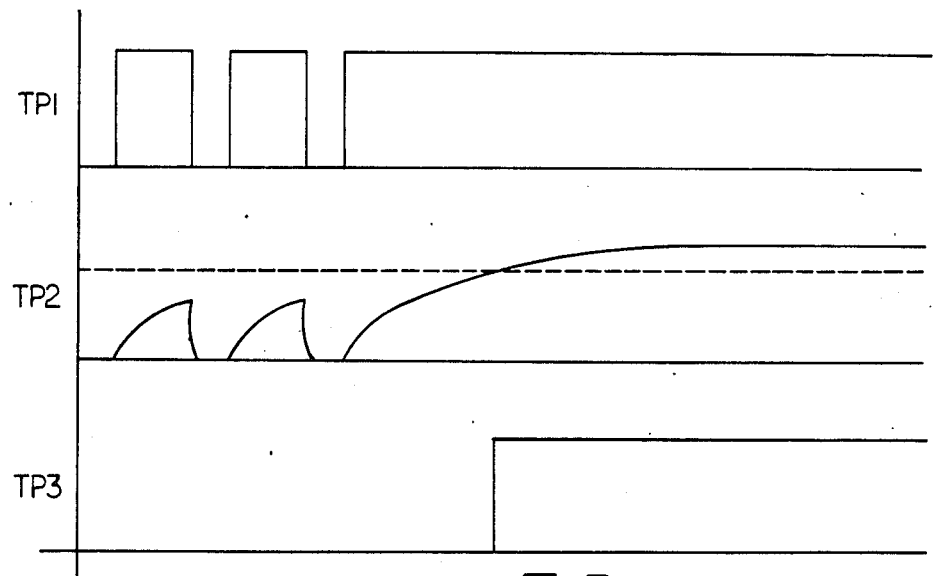
FIG. 3 is a graphic timing diagram of various waveforms associated with the embodiment of FIG. 2.

Operation of the apparatus 10 is best described in relation to its use with a motor and motor control circuit of the type commonly found in industrial vehicles such as electrical lift trucks. Reference to the timing diagram of FIG. 3 will be helpful in understanding the discussion relating to the operation of the apparatus 10. Assuming first that the motor control circuit 26 is operating normally, the SCR 68 and the transistor switch 76 are deenergized, and a logic "high" signal is delivered from the logic circuit 22 through the resistor 40 to the transistor switch 38. Responsively, the solenoid coil 36 is energized and the line contactor 14 is closed. Therefore, in response to control pulses delivered from the logic circuit 22 to the power control switch 16, the electrical motor 18 is operated at a predetermined speed and in a direction controlled by the direction contacts 32a-d. The power pulses delivered from the motor power supply 12 through the line contactor 14 and the power switching element 16 to the electrical motor 8 are depicted in the waveform shown at TP1.

Each of these pulses is detected by the timing means 42. In response to the pulse delivered to the electrical motor 18 being a logic "high", the capacitor 50 is charged through the resistor 46, as depicted at TP2. The magnitude of the voltage charge on the capacitor 50 is delivered through the diode 54 and the voltage follower transistor 56 to the gate terminal of the SCR 68. The zener diode 53 provides a threshold voltage level for the timing means 42. The conditioning circuit 58 including the resistor 60, capacitor 62, and resistor 64 is a simple filter to prevent electrical noise impulses from adversely affecting the SCR 68. The R/C timing element 44 is selected such that the capacitor 50 can never charge to the gate threshold voltage of the SCR 68 during the maximum duration of one pulse delivered from the logic circuit 22 to the power switching element 16.

In response to the pulse delivered to the electrical motor 18 switching to a logic "low" status, the capacitor 50 rapidly discharges through the diode 48, and the voltage delivered to the gate terminal of the SCR 68 is reduced to a low value. The capacitor 50 is discharged through a combination of the electrical motor 18 and the resistor 52. The resistor 52 ensures that a suitable discharge path is provided for the current flowing out of the capacitor 50, regardless of the inductive effect of the electrical motor 18 and the electrical resistance of the direction contactors 32a–d.

So long as the threshold voltage of the gate terminal of the SCR 68 is not exceeded by the voltage charge delivered from the R/C timing element 44, the signal delivered at TP3 remains at a logic "low" level. Therefore, the transistor switch 76 remains "off", and the logic circuit 22 retains full control over the status of the line contactor 14.

Now assuming that a fault condition occurs, for example, a short circuit of the power switching element 16 or a failure of the logic circuit 22 to produce a command signal turning "off" the power switching element 16, the shutdown circuit 24 becomes effective. In response to the continuous logic "high" power signal delivered to the electrical motor 18, as shown in the right portion of the diagram at TP1, the capacitor 50 continues to charge through the resistor 46. The fault signal delivered from the timing means 42 to the latch means 66 eventually exceeds the trigger voltage of the SCR 68. Responsively, the SCR 68 turns "on" and delivers a blocking signal through the resistor 70 and the SCR 68 to the interrupt means 74. The transistor switch 76 turns "on" in response to receiving the blocking signal, and the input to the transistor switch 38 is clamped at circuit ground. Therefore, regardless of the signal delivered from the logic circuit 22 through the resistor 40, the transistor switch 38 is turned "off" and the solenoid coil 36 is responsively deenergized. In response, the line contactor 14 is opened and power can no longer flow from the motor power supply 12 to the electrical motor 18.

In response to opening the line contactor 14, the R/C timing element 44 discharges as discussed above. However, the SCR 68 remains energized owing to the continued current flow from the motor power supply 12 through the resistor 70 and the resistor 72. Therefore, the interrupt means 74 continues to block power from the motor power supply 12 to the electrical motor until the motor power supply 12 is temporarily disconnected from the latch means 66. Once current flow is interrupted through the SCR 68, the SCR 68 commutates naturally as is known in the art, and the shutdown circuit 24 is reset.

The shutdown circuit 24 described above operates directly from the motor power supply 12 and is completely independent of the logic power supply 20 and the logic circuit 22. Therefore, failure of the logic power supply 20 or the logic circuit 22 has no effect on the operation of the shutdown circuit 24. In addition, the shutdown circuit 24 is of simple construction and is composed of relatively inexpensive components.

Other aspects, objects, advantages, and uses of this invention can be obtained from a study of the drawings, the disclosure, and the appended claims.

I claim:

1. Apparatus for controllably disabling a electrical motor circuit in response to detecting a predetermined condition of a pulse modulated power switching element, said electrical motor circuit including an electrical motor serially connected to a power supply through said power switching element, comprising:

logic means for controllably operating said electrical motor in response to predetermined command signals;

a logic power supply connected between said motor power supply and said logic means and adapted to deliver conditioned electrical power to said logic means;

timing means for monitoring the electrical conduction of said ower switching element and producing a fault signal in resonse to said power switching element continuing to conduct for longer than a predetermined continuous period of time;

latch means for receiving said fault signal and responsively producing a blocking signal;

interrupt means for receiving said blocking signal and responsively controllably blocking power from said motor power supply to said electrical motor, said interrupt means including a line switch having switchable power terminals serially connected between said motor power supply and said electrical motor; and wherein each of said timing, latch, and interrupt means is adapted to operate directly from said motor power supply independent of said logic power supply and said logic means.

2. Apparatus for controllably disabling an electrical motor circuit in response to detecting a predetermined condition of a pulse modulated power switching element, said electrical motor circuit including an electrical motor serially connected to a motor power supply through said power switching element, comprising:

logic means for controllably operating said electrical motor at a speed and direction responsive to predetermined command signals;

a logic power supply connected between said motor power supply and said logic means and adapted to deliver conditioned constant voltage electrical power to said logic means;

a timing circuit having a R/C timing element and being connected to said power switching element;

a semiconductor switch having a first input terminal connected to said timing circuit and a second input terminal connected to said motor power supply;

a line switch having a control element connected to said semiconductor switch and having switchable power terminals serially connected between said motor power supply and said electrical motor; and each of said timing circuit and said semiconductor switch being free from connection to said logic power supply.

* * * * *